United States Patent [19]
Siwersson et al.

[11] 3,811,952
[45] May 21, 1974

[54] METHOD AND APPARATUS FOR SUPPLYING ENTIRELY OR SUBSTANTIALLY ENTIRELY CONSUMABLE METALLIC MATERIAL TO A MAGNETIC ELECTRODE IN A METAL/OXYGEN OR METAL/AIR CELL

[75] Inventors: Olle Lennart Siwersson; Karl Gunnar Tell, both of Helsingborg, Sweden

[73] Assignee: AB St. Powercell, Helsingborg, Sweden

[22] Filed: June 20, 1973

[21] Appl. No.: 371,618

Related U.S. Application Data
[63] Continuation of Ser. No. 185,943, Oct. 4, 1971, abandoned.

[30] Foreign Application Priority Data
Oct. 8, 1970    Sweden.......................... 13627/70

[52] U.S. Cl............................................. 136/86 A
[51] Int. Cl. ........................................ H01m 27/00
[58] Field of Search ............... 136/86 A, 86 E, 86 R

[56] References Cited
UNITED STATES PATENTS
| | | | |
|---|---|---|---|
| 3,409,471 | 11/1968 | Sturm et al........................ | 136/86 E |
| 3,432,354 | 3/1969 | Jost.................................. | 136/86 R |
| 3,663,298 | 5/1972 | McCoy ............................. | 136/86 A |

Primary Examiner—Helen M. McCarthy
Assistant Examiner—H. A. Feeley
Attorney, Agent, or Firm—Karl W. Flocks

[57] ABSTRACT

A method and apparatus for supplying substantially entirely consumable metallic material to a magnetic electrode in a metal/oxygen cell which also includes an oxidizing agent electrode and an electrolyte, comprises supplying the metallic material in the form of particles having ferromagnetic properties and in such proximity to the magnetic electrode that the particles are attracted by and retained to it.

11 Claims, 1 Drawing Figure

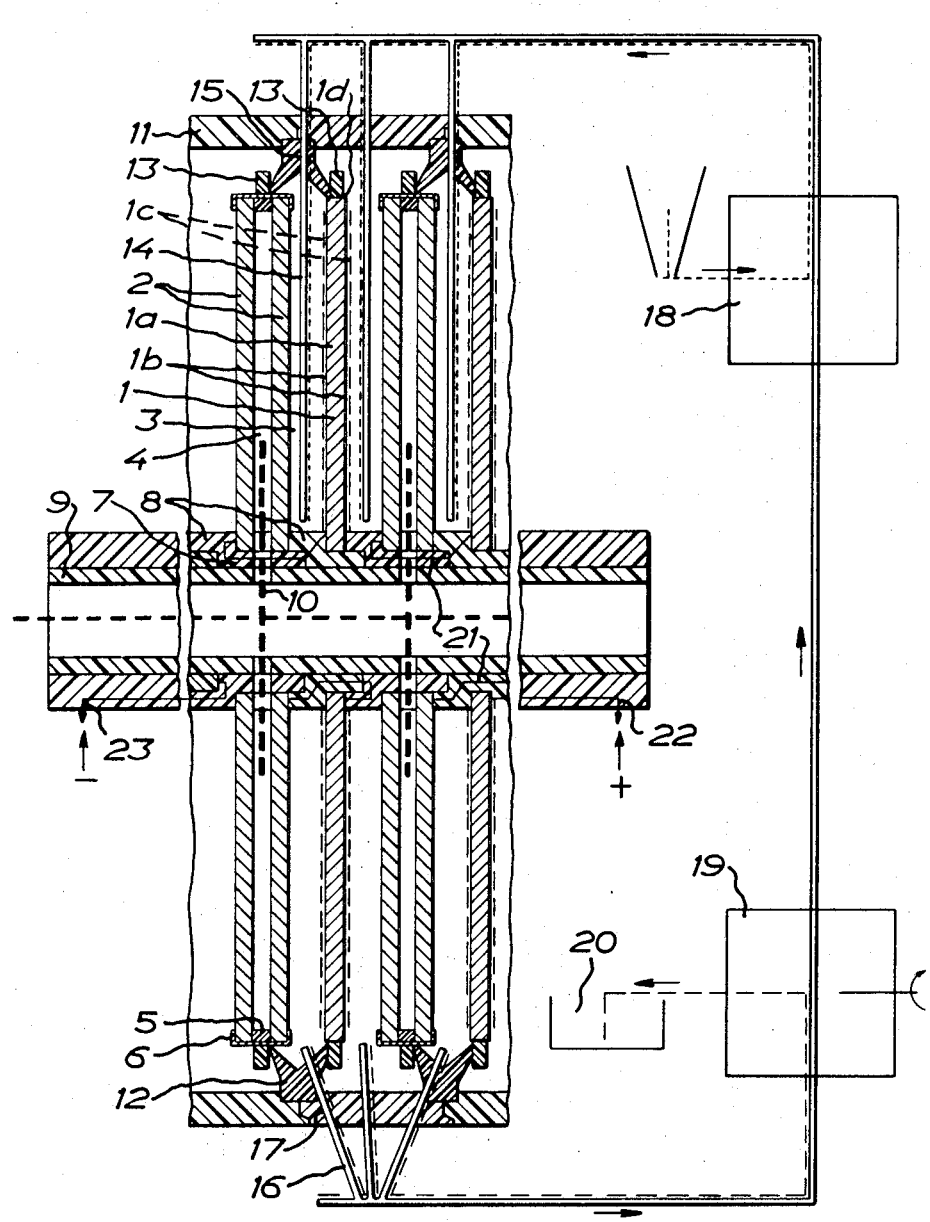

METHOD AND APPARATUS FOR SUPPLYING ENTIRELY OR SUBSTANTIALLY ENTIRELY CONSUMABLE METALLIC MATERIAL TO A MAGNETIC ELECTRODE IN A METAL/OXYGEN OR METAL/AIR CELL

This is a continuation of application Ser. No. 185,943, filed Oct. 4, 1971, now abandoned.

It is prior art to dispose in fuel cells a ferromagnetic catalyst material as a thin particle layer on a magnetic electrode. The particles which are loose are retained to the electrode surface by magnetic forces and are in electric contact with the current conducting electrode. The electrode may be intermittently magnetic, which implies that an attracted catalyst layer can be caused to come loose from the electrode and can be replaced by a new layer. The catalyst layer can thus be renewed, which constitutes the essential advantage of the prior art electro-chemical cells.

In the cells described it is known to use hydrogen gas and organic compounds as fuel. The hydrogen gas can be supplied either so that it is flushed about the fuel electrode or in such a way as to be adsorbed on the catalyst grains by a particular treatment before the catalyst grains are supplied to the fuel cell. The organic compounds can either be dissolved in the electrolyte or, analoguously with hydrogen, be adsorbed on the catalyst grains.

The present invention is based on the realization that very substantial advantages can be attained in fuel cells having magnetic fuel electrodes by the use of a fuel of metallic material which is supplied in the form of particles having ferromagnetic properties. The use of such a fuel eliminates all problems of transporting and storing hydrogen gas, which int.al. comprises the need for heavy-weight pressure cylinders and makes the hydrogen gas expensive as fuel. The problems associated with organic fuels and manifesting themselves particularly in high polarization, are also eliminated.

As will appear more definitely from the following description, the invention makes it possible to use a ferromagnetic material which as distinct from a ferromagnetic catalyst material, is entirely consumed in the fuel cell, thereby losing its magnetic properties so that the attraction to the fuel electrode ceases.

The invention more specifically relates to a method and apparatus for supplying entirely or substantially entirely consumable metallic material to a magnetic electrode in a metal/oxygen or metal/air cell which in addition includes an oxidizing agent electrode and an electrolyte. The method of the invention comprises supplying the metallic material in the form of particles having ferromagnetic properties and in such a proximity to the magnetic electrode that the particles are attracted by and retained to it.

The magnetic electrode or the fuel electrode may be permanently magnetic or intermittently magnetic; in the latter case it can be a connectable and disconnectable electromagnet. If consisting only of fuel, the ferromagnetic particles can be caused, also with the use of a permanently magnetic fuel electrode, to disappear from the fuel electrode while leaving the original fuel electrode surface. The metal in the particles attracted to the fuel electrode in fact are converted entirely into ion form, simultaneously losing their ferromagnetic properties and coming loose from the electrode. The possibility of entirely renewing the fuel electrode surface by using a permanent magnet with its simpler construction, is an important property of the present invention.

Particular preference is given to fuel in the form of iron particles which are inexpensive and can be transported and stored without any problems and which can also be consumed at least substantially entirely at the fuel electrode. However, it is fundamentally possible to use other ferromagnetic materials, such as cobalt and nickel, as well as an alloy having ferromagnetic properties. It is further possible to use non-ferromagnetic material as fuel, such as zinc and aluminium, if they are provided as coatings on a core of ferromagnetic material such as nickel or iron.

In an advantageous embodiment of the invention the fuel is distributed over the surface of the fuel electrode in such a way that different parts of the surface are successively supplied with fuel, in which case the supply of fresh fuel to part of the surface takes place only after the fuel has been substantially entirely consumed. In such a way fresh fuel can always be supplied to a pure part of the fuel electrode surface simultaneously as the surface of the fuel electrode can be exploited to an optimum extent while yielding a uniform effect.

A simple way in which to realize the above distribution is to supply the metal particles making up the fuel continuously or by portions to the fuel electrode, to cause the fuel electrode to rotate past the fuel supply point and to adapt the fuel supply and/or the speed of rotation of the fuel electrode so that the fuel supplied to that part of the fuel electrode which at a given time passes the fuel supply point is at least substantially entirely consumed when the same part of the fuel electrode, after the fuel electrode has made one revolution, again passes the fuel supply point and is coated with fresh fuel.

The invention will be more fully described in an embodiment thereof with reference to the accompanying drawing in which a section of a fuel cell battery for carrying out the method of the invention is illustrated.

In the metal/oxygen or metal/air cell battery, of which but a small proportion of the total number of cells is shown for greater clarity of the drawing, each cell consists of a fuel electrode 1 in the form of a disc, an air or oxygen electrode 2 also in the form of a disc, and an electrolyte chamber 3 situated between them. Each fuel electrode 1 comprises a permanent magnet in the form of a disc 1a (common to two fuel electrodes) having its poles directed in the axial direction of the battery, one wall 1b of a plastic housing, and an electrically conductive contact surface 1c arranged on the outer side of the wall and being in the form of a thin foil or fine grid of, e.g., nickel. The two walls 1b on each side of the magnet annulus 1a surrounds together with the end wall 1d the magnet annulus so as to form a tight housing. Each air or oxygen electrode 2 comprises a porous disc composed of a mixture of silver and nickel. The active layer of said disc can be prepared by mixing 10 parts by weight of silver having an average grain size of 5 microns with 90 parts by weight of nickel having an average grain size of 5 microns, whereupon the mixture is shaped into an electrode under a pressure of 1,000 kg/sq.cm. and the shaped electrode is sintered in hydrogen gas at 500°C. On the side facing the electrolyte in the electrolyte chamber 3 the electrode 2 in conventional manner has an inactive layer with fine pores, e.g., of sintered nickel with a particle size of 3 microns. Sintering of the inactive layer can take place simultaneously as that of the active layer in that the nickel having the smaller grain size is disposed as a layer on top of the mixture of silver and nickel. That side of the electrode 2 where the coarser pores are exposed faces a gas chamber 4 containing oxygen or air. The surface of the side of each fuel electrode and oxygen or air electrode facing the electrolyte can be about 1,000 sq.cm. Each gas chamber is defined in radial direction outwardly by a spacer ring 5 and a bar 6, both of plastic material, and inwardly by spacing members 7, also of plastic material, which like the gas chamber are common to a pair of oxygen or air electrodes. Also the electrode chambers the electrolyte of which can be an aqueous solution of potassium hydroxide in a concentration of 30 percent by weight, is defined inwardly by spacing elements 8 of plastic material. Fuel electrodes having coverings and conductive contact surfaces as well as the oxygen or air electrodes and the spacing members 7 and 8 are fastened to a central tube 9 likewise of plastics material. Supply of oxygen or air to the gas chambers 4 takes place through the central tube 9 and passages 10 leading through the wall thereof and through the spacing members 7 along the path shown by a dotted heavy line.

The battery is defined outwardly by an outer container 11, preferably also of plastic material. A double axial seal 12 of plastic material is fastened in the outer container and arranged between it and each cell. For this reason also a ring 13 of plastic material is secured to the housing surrounding each magnet annulus and to each bar 6. The electrolyte which is circulated through the electrolyte chambers is supplied via supply tubes 14 having openings or nozzles distributed along the tubes and facing the fuel electrode in each cell. The supply tubes are disposed in passages 15 leading through the outer container and the axial seals. Discharge of electrolyte takes place through discharge tubes 16 arranged diametrically opposite the point where the supply tubes are arranged. The discharge tubes are likewise arranged in passages 17 leading through the outer container and the axial seals. The path of the electrolyte is marked by a full heavy line. The fuel in the form of iron particles having a grain size of about 40 microns are supplied to the electrolyte via the injector 18 and accompanies the electrolyte to the battery. The path of the iron particles is marked with a densely dotted fine line. The iron particles are oxidized in the fuel battery. The reaction products accompany the electrolyte out of the fuel cell. Their path is marked with a sparsely dotted fine line. They are removed from the electrolyte in the electrolyte pump 19 which is provided with self-cleaning filters (rotary) and are collected in a container 20. If the fuel cell is driven with small fuel quantities it is possible in certain cases to dispense with cleaning devices for the electrolyte and to permit the reaction products to accompany the electrolyte when it is returned to the battery.

The spacing elements 8 have embedded contact bars 21 for series connection of the cells. The terminals of the positive pole and the negative pole, respectively, are designated 22 and 23, respectively. The terminals can be formed int.al. as brushes or alternate taps.

The plastic material in the different parts of the fuel cell battery can be int.al. chlorinated polyether, polypropylene, polyethylene, nylon and fluorine plastic.

In practicing the inventive method in the apparatus illustrated in the drawing the electrodes are rotated about the axis of the central tube under continuous supply of fuel in a uniform concentration radially, which implies that the absolute amount of fuel supplied through the openings in the supply tubes 14 increases from the inner portion of each fuel electrode to the periphery thereof. The supply of fuel is so dimensioned that the fuel which has been supplied at a given time to a small sector of the fuel electrode has finished its reaction when the same sector again passes the openings of the supply tubes. With the above examples of the sizes of electrode surfaces and the grain size of the iron particles, the consumption of iron powder will be of the order of 1 cu.cm. per minute and per cell. The speed of rotation can then be less than one revolution per minute.

Some alternative devices for practising the method according to the present invention are described in the following.

The apparatus illustrated in the drawing can be modified so that the magnet annulus can rotate within the surrounding plastic housing which is then stationary. The iron powder will then partake in the magnetic rotation on the outer side of the adjacent walls of the housing. The powder particles will move individually by a rocking action, which is suitable at thick coatings. In this case the oxygen and air electrodes, respectively, preferably are stationary.

In another modification, the magnet annulus with its housing can rotate while the oxygen and air electrodes, respectively, remain stationary. The iron powder then lies stationary on the housing walls. In this embodiment a favourable agitation of the electrolyte is attained.

In a further embodiment both the fuel electrodes and the oxygen and air electrodes, respectively, can remain at standstill while the supply devices for the electrolyte and fuel are movable over the surface of the fuel electrode, e.g. are rotary. In that case, they can be formed so as to be self-propelled under the reaction pressure in the nozzles. The fuel electrodes having stationary electrodes can also be arranged in sectors having several electrolyte nozzles distributed over each electrode surface, which in turn of order and in a predetermined pattern are exploited for the supply of fuel.

In still another embodiment the fuel electrode can be arranged so as to have a rotary electric magnet field, electro-magnets being disposed on the outer side of a ferromagnetic core.

What we claim and desire to secure by Letters Patent is:

1. A method of supplying substantially entirely consumable metallic material to a magnetic electrode in a metal-oxygen cell which also includes an oxidizing agent electrode and an electrolyte comprising the steps of supplying metallic material in the form of particles having ferromagnetic properties to the cell,
coating said metallic material over a portion of the surface of a rotatable magnetic electrode in the cell in a predetermined proportion,
rotating said magnetic electrode through the electrolyte and consuming said metallic material in a period of up to one revolution,
recoating said metallic material over the surface of said magnetic electrode from which said metallic material has been consumed and removed, and removing the consumed now non-magnetically attractive material from the cell.

2. The method of claim 1, further characterized by
the substantially complete consuming of said metallic material on said magnetic electrode taking place during each full rotation of said electrode.

3. The method of claim 1, further characterized by
said rotatable magnetic electrode being in the form of a disc.

4. The method of claim 1, further characterized by
said coating and recoating over the surface of said magnetic electrode taking place in a continuous manner.

5. The method of claim 1, further characterized by
said coating and recoating over the surface of said magnetic electrode taking place over continuous subsequent sections of said surface.

6. A metal-oxygen cell comprising
an oxidizing agent electrode,
a magnetic electrode mounted for rotation,
an electrolyte connecting said electrodes,
metallic material in the form of particles having ferromagnetic properties,
means to supply said metallic material in the form of particles having ferromagnetic properties to said magnetic electrode to allow attraction to and coating of a part of the surface of said magnetic electrode with said particles in a proportion to allow consumption of said particles by the time said magnetic electrode completes that part of a revolution up to one revolution which returns said part of the surface to magnetic attraction distance of said supply means,
and means to remove from the cell said metallic material that has been consumed and changed its form.

7. The metal-oxygen cell of claim 6, further characterized by
said magnetic electrode being a disc.

8. The metal-oxygen cell of claim 6, further characterized by
said metallic material being iron particles.

9. The metal-oxygen cell of claim 6, further characterized by
said oxidizing agent electrode including air supplied to the cell.

10. The metal-oxygen cell of claim 6, further characterized by
said particles of metallic material having non-ferromagnetic coatings of metallic material.

11. The metal-oxygen cell of claim 6, further characterized by
said supply means having a plurality of inlets in the path of rotation of said magnetic electrode spaced where consumption of particles on said magnetic electrode has been completed and said particles have already fallen from said magnetic electrode.

* * * * *